United States Patent [19]

Dorward et al.

[11] Patent Number: 5,701,389
[45] Date of Patent: Dec. 23, 1997

[54] WINDOW SWITCHING BASED ON INTERBLOCK AND INTRABLOCK FREQUENCY BAND ENERGY

[75] Inventors: Sean Matthew Dorward, Somerville; James David Johnston, Warren, both of N.J.

[73] Assignee: Lucent Technologies, Inc., Murray Hill, N.J.

[21] Appl. No.: 381,376

[22] Filed: Jan. 31, 1995

[51] Int. Cl.$^6$ .................................................. G10L 7/04
[52] U.S. Cl. .................................. 395/2.12; 395/2.38
[58] Field of Search ........................... 395/2, 2.1, 2.14,
395/2.15, 2.17, 2.19, 2.2, 2.23, 2.24, 2.35,
2.36, 2.37, 2.4, 2.55, 2.56, 2.57, 2.6, 2.61,
2.62, 2.12; 381/41–43, 45–47

[56] References Cited

U.S. PATENT DOCUMENTS

| | | | |
|---|---|---|---|
| 4,032,710 | 6/1977 | Martin et al. | 395/2.62 |
| 4,110,560 | 8/1978 | Leary et al. | 395/2.24 |
| 4,630,300 | 12/1986 | Kang et al. | 395/2.17 |
| 4,769,844 | 9/1988 | Fugimoto et al. | 395/2.57 |
| 4,817,155 | 3/1989 | Briar et al. | 395/2.17 |
| 4,982,341 | 1/1991 | Laurent | 364/517 |
| 5,285,498 | 2/1994 | Johnston | 395/2.15 |
| 5,459,814 | 10/1995 | Gupta et al. | 395/2.23 |

Primary Examiner—Allen R. MacDonald
Assistant Examiner—Robert C. Mattson
Attorney, Agent, or Firm—D. M. Rosenblatt

[57] ABSTRACT

A method of encoding an audio signal is disclosed. The method comprises partitioning the audio signal into a first time block and a second time block. Next, a first time block first energy value and a first time block second energy value are calculated. Next, a second time block first energy value and a second time block second energy value are calculated. Next, the technique determines if an attack has occurred in the second time block by comparing the second time block first energy value and the second time block second energy value and also comparing the Erst time block and the second time block Advantageously, the method identifies attach such that the decoder can reproduce the attacks with little audible distortion and also affords the advantage of using long windows for portions of the audio signal that do not contain attacks.

9 Claims, 3 Drawing Sheets

WINDOW SWITCHING BASED ON INTERBLOCK AND INTRABLOCK FREQUENCY BAND ENERGY

FIELD OF THE INVENTION

The present invention relates to the coding of audio signals. More specifically, the present invention relates to the selection of a window function for encoding multichannel audio signals such as stereo signals.

BACKGROUND OF THE INVENTION

Many audio signals contain rapid increases in energy based upon, e.g., sounds emanating from castanets and triangles. These rapid increases in energy are referred to as "attacks." Typically, "attacks" are difficult to encode and reproduce accurately such that the attacks will sound undistorted.

Known digital encoding techniques use a process called "window switching." A window is a series of values that is used to multiply a corresponding series of a sampled time domain signal. Typically, for a given audio signal, fewer bits are required to encode the signal with long windows as opposed to short windows. However, this is not true during the portions of audio signals that are subject to attacks. During these portions, the encoder switches from a long window to a short window. Attacks, due to their short time duration, are broadband in nature. In the absence of an attack, long windows are used to encode the frequency representation of the audio signal. However, if an attack occurs, short windows are used to encode the frequency representation. Typically, a long windows range from representing about 20 to 40 milliseconds of an audio signal and short windows range from about 2.5 to 5.0 milliseconds.

One such process involves encoders that switch from long windows to short windows based upon a measure of total energy difference between a first time block and a second time block of the sampled time domain signal. A problem with this technique is that low frequency energy may result in coding with short windows. For example, a 10 Hz sinusoidal wave may trigger a block switch every 180 degrees. Thus, the coding is less efficient because the encoder has not extracted as much redundancy as would be extracted with use of long windows.

Another technique, as described in U.S. Pat. No. 5,285, 498 ("the '498 patent"), switches from long windows to short windows based upon a change in perceptual entropy of the audio signal. For a given long window, the perceptual entropy is based upon the perceptual model and a frequency representation of the long window. FIG. 6, inter alia, of the '498 patent discloses how to implement such a technique. However, even this technique suffers from false positives and false negatives. False positives may occur due to interaction between the frequency response of the long window and the frequency response of the perceptual model of the portion of the audio signal corresponding to the long window. False negatives may occur when two attacks are spaced closely in time.

It is desirable to design an encoder that identifies attacks so that the decoder can reproduce the attacks with little audible distortion; this also affords the advantage of using long windows for portions of the audio signal that do not contain attacks.

SUMMARY OF THE INVENTION

A method of encoding an audio signal is disclosed. The method comprises partitioning a portion of the audio signal into a first time block and a second time block. Next, a first time block first energy value and a first time block second energy value are calculated. The first time block first energy value represents an mount of energy in a first frequency band of the first time block. The first time block second energy value represents an amount of energy in a second frequency band of the first time block. Next, a second time block first energy value and a second time block second energy value are calculated. The second time block first energy value represents an amount of energy in a first frequency band of the second time block. The second time block second energy value represents an amount of energy in a second frequency band of the second time block. Next, the technique determines if an attack has occurred in the second time block by comparing the second time block first energy value and the second time block second energy value and also comparing the first time block and the second time block.

Advantageously, the method identifies attacks such that the decoder can reproduce the attacks with little audible distortion and also affords the advantage of using long windows for portions of the audio signal that do not contain attacks.

Other advantages of the method will become apparent to those skilled in the art from the detailed description and associated figures.

DETAILED DESCRIPTION

The '498 patent is incorporated by reference herein as if set forth in its entirety. Also, U.S. Pat. No. 5,625,745, issued Apr. 29, 1997 to Dorward et al is incorporated by reference herein as if set forth in its entirety.

Figure 1:
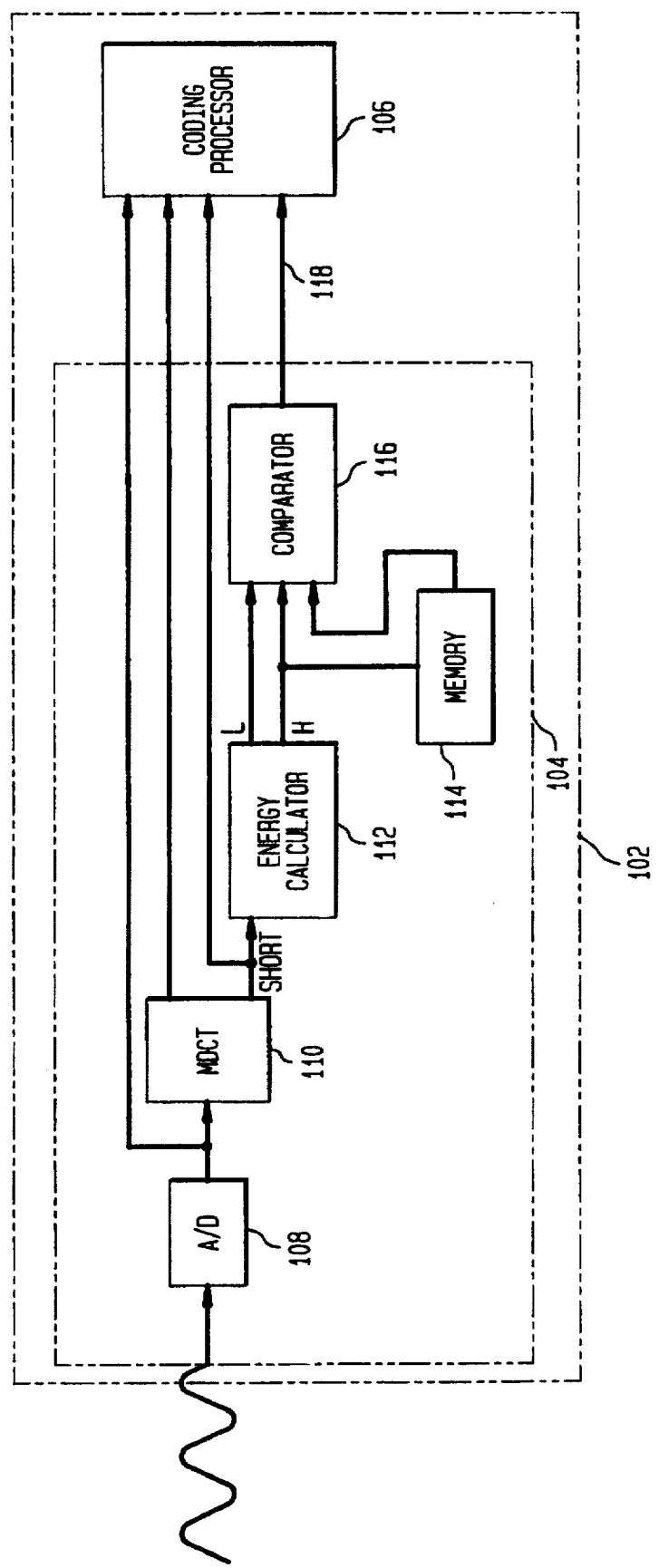
FIG. 1 shows a block diagram of an audio encoder made in accordance with the present invention.

FIG. 1 shows an audio encoder 102 comprising a preprocessor 104 and a processor 106. The preprocessor 104 is designed to inform the processor 106 as to whether or not a long window or a short window will be used.

Still referring to FIG. 1, the preprocessor 104 comprises an analog to digital converter ("A/D") 108, a modified discrete cosine transformer ("MDCT") 110, an energy calculator 112, a memory 114, and a comparator 116, all connected as shown.

Again referring to FIG. 1, the process by which the preprocessor operates will be explained. The input to the A/D 108 is an analog signal. The output is a digital representation, in the time domain, of the analog signal. The digital representation is a sample of the analog signal occurring at 48 kHz. 1024 samples represent 22.67 milliseconds of the audio signal. Thus, every 22.67 milliseconds, 1024 samples are input into the MDCT 110. For each 1024 new samples input into the MDCT 110, one long block comprising 1024 frequency outputs, and 8 short blocks, each short block comprising 128 frequency outputs, is calculated.

Figure 2:
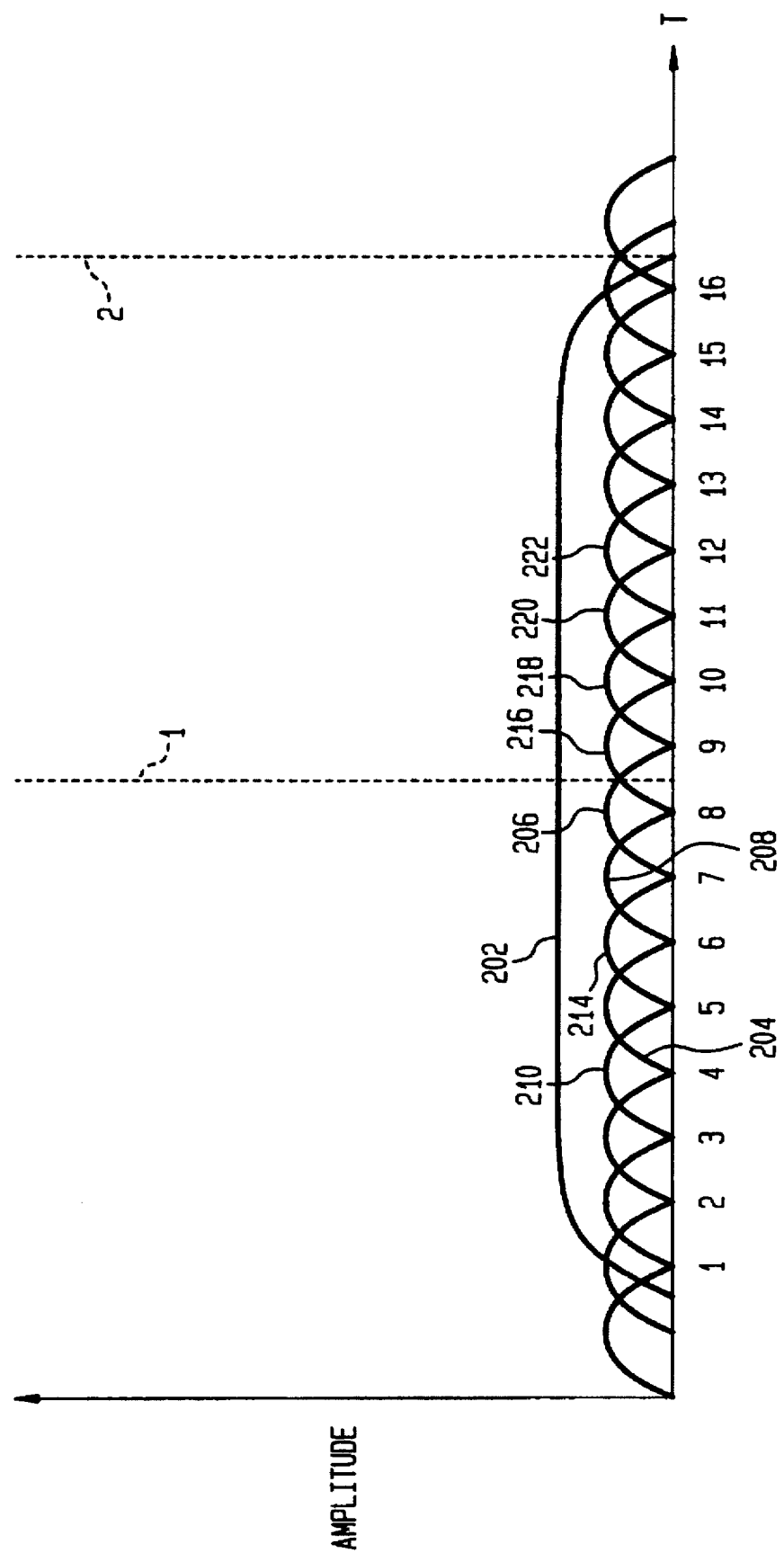
FIG. 2 shows a relationship between a set of short windows and long window, both of which may be used in a window switching technique to encode an audio signal.

Referring to FIG. 2, the new data in the long block is represented by the data between dashed lines 1 and 2. The long window 202 shows the 2048 time samples that are used to calculate the 1024 frequency outputs. Likewise, the new data between time five and time six is the new data for the first 128 frequency outputs using short window 204. The 128 frequency outputs are calculated from the 256 values corresponding to window 204.

Again referring to FIGS. 1 and 2, we will explain the operation of energy calculator 112. Each energy calculation has two components, a low component and a high component. Preferably, the dividing line between the low and high component is 3 kHz. For short window 206, the MDCT outputs 128 frequency outputs. Each of these 128 outputs is squared. The first 16 results are summed to provide the low component of the energy calculation. The remaining 112 are summed to provide the high component of the energy calculation.

Referring to FIGS. 1 and 2, the comparator 116 operates as follows. The comparator takes as its inputs the low component of the energy calculation for short window 206, the high component of the energy for short window 206, and the high component of the energy calculation for short window 208 previously stored in memory 114. The comparator will indicate that an attack has occurred in short block 206 if the following two conditions are met, namely:

1: if the high component of the energy calculation for short window 206 is at least five times greater than the high component of the energy calculation for short window 208; and 2: if the high component of the energy calculation for short window 206 is at least one eighth of the low component of the energy calculation for short window 206.

If both these conditions are met, the comparator will provide an output on line 118 indicating that an attack has occurred in short window 206. More specifically, the output indicates that the attack has occurred between time eight and time nine.

Again referring to FIG. 1, the coding processor 106 takes as its inputs the digital representation, the output of the MDCTs, and the comparator output. The coding processor may manipulate these inputs in a variety of ways to perform window switching. On way in which these inputs may be manipulated is described in the '498 patent at column 13, line 56 through column 14, line 29. Once proper window switching has been determined, the coding may proceed.

Figure 3:
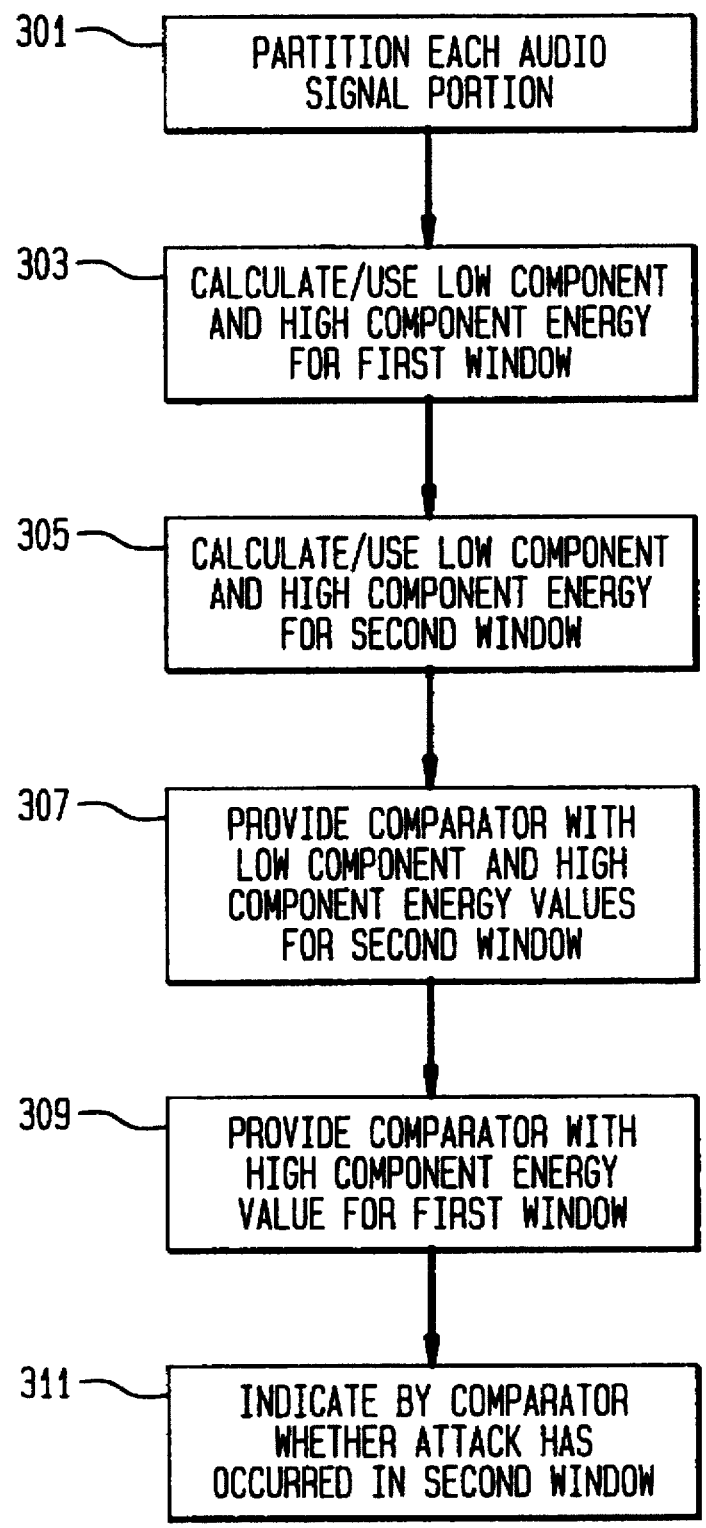
FIG. 3 is a flow chart depicting the steps of a process performed in the audio encoder of FIG. 1.

Having described the process performed upon short window 206 and short window 208 with reference to FIGS. 1 and 2, it should be noted that an identical process is applied to a set of additional time blocks. The set of additional time blocks corresponds to short windows 210, 204, 214, 216, 218, 220, and 222. It should be noted that the set of additional time blocks, in addition to the first time block and the second time block (corresponding to short windows 206 and 208, respectively) are N short windows that essentially align in time with the long window 202. The set of additional time blocks are arranged in the following sets of two short windows: short windows 210 and 204; short windows 204 and 214; short windows 214 and 208; short windows 206 and 216; short windows 216 and 218; short windows 218 and 220; and short windows 220 and 222. Each of the sets of two short windows may be thought of as a different portion of the audio signal. Each portion of the audio signal is partitioned into a first time block and a second time block as indicated at step 301 in FIG. 3.

Again referring to FIGS. 1 and 2, the short window that is listed second in the above listed sets of two short windows is the window in which an attack, if any, will be identified. The first listed window in each set will be referred to as the "first window" and the second listed window in each set will be referred to as the "second window." For each of these sets of two short windows, a set of 128 frequency outputs is calculated for each first window and each second window. Next, the energy calculator 112 calculates/uses a low component and a high component for the first window and the second window as indicated at steps 303 and 305 in FIG. 3, respectively. The phrase "calculates/uses" is used as opposed to "calculates" because if the high component and the low component for the energy associated with short window 220 is calculated for the set of two short windows 218 and 220, it need not be "calculated" again for the set of two short windows 220 and 222. Instead, the energy values may simply be reused. The comparator takes as its inputs the low component and high component of the energy calculation for the second window (step 307 in FIG. 3) and the high component of the energy calculation for the first window previously stored in memory 114 (step 309) and indicates, by using the method described above, whether or not an attack has occurred in the second window (step 311). Thus, for example, if the first window is short window 220 and the second window is short window 222, and if the comparator indicates that an attack has occurred, it is indicating that an attack has occurred between time twelve and time thirteen. Next, the coding processor 106 takes appropriate inputs and determines proper window switching, after which the coding may proceed.

It is possible for an analysis of 1024 outputs of the MDCT 110 to impact a subsequent 1024 outputs of the MDCT 110. We will now explain treatment of a subsequent set of 1024 outputs from the MDCT 110 based upon the set of two windows 218 and 220 and the set of short windows 220 and 222. There are two instances in which the set of two short blocks 218 and 220 and/or the set of two short blocks 220 may impact subsequent MDCT outputs. These will now be described.

First, with respect to the set of two windows 220 and 222, if an attack occurs in short window 222 (i.e., between time 12 and time 13), two indications will be made. First, the comparator 116 will indicate that the 1024 outputs of the MDCT corresponding to the long block in which short window 222 is located be encoded with short windows, as described above. Second, the next 1024 outputs of the MDCT will also be encoded with short windows.

Second, with respect to the set of two windows 218 and 220, if an attack occurs in short window 220 (i.e., between time 11 and 12), one indication will be made and another indication may be made. First, the comparator will indicate that the 1024 outputs of the MDCT corresponding to the long block in which short window 220 is located be encoded with short windows, as described above. Also, if the attack occurring in short window 220 is a "strong attack," the next 1024 outputs of the MDCT will also be encoded with short windows. A strong attack is considered to have occurred if; e.g., $\Delta E_{H(218 \text{ to } 220)}$ is greater than $\Delta E_{H(216 \text{ to } 218)}$ wherein $\Delta H_{H(\text{small window } X \text{ to small window } Y)}$ represents the change in high component of the energy calculation from small window X to small window Y.

We have thus far described a technique for encoding an audio signal based upon analysis of short windows for a given 1024 outputs from the MDCT 110. However, the digital representation of most audio signals that are to be encoded are longer than 1024 samples. Thus, although we have described how to process a set of N short windows (i.e., short windows 210, 204, 214, 208, 206, 216, 218, 220, and 222) that essentially align in time with the long window 202 and how the processing of the sets of two windows 218/220 and 220/222 may impact subsequent outputs of the MDCT, those skilled in the art will appreciate that most audio signals are longer in time than long window 202 and that the process described for the set of N short windows must be repeated for each set of N short windows corresponding to the audio signal.

The present invention has been described in the environment of an encoder. However, those skilled in the art will realize that there are many modifications that may be made to the above described invention. For example, the technique may be used on time domain signals (i.e., without converting to a frequency representation). Also, the invention may be used in any multi-channel (e.g., five channel) encoding system. In such a situation, one could use the above described techniques for each of the five channels. Alteratively, for a stereo pair such as a left channel signal and a right channel signal, the calculated energies for both the left channel signal and the right channel signal may be added and simply treated as one channel for purposes of determining whether or not to use short windows or a long window on the left channel signal and the right channel signal. Additionally, the invention may be used to manufacture a digital storage medium (e.g., compact disk, CD-ROM, Digital Audio Tape, etc. . . . ). Still further, the invention may be used in a transmission environment (e.g., digital audio broadcast) rather than a recording environment. Thus, the invention is defined by the appended claims.

What we claim is:

1. A method of encoding a portion of an audio signal, the method comprising:
   (a) partitioning the portion of the audio signal into a first time block and a second time block;
   (b) calculating a first time block first energy value and a first time block second energy value, the first time block first energy value representing an amount of energy in a lust frequency band of the first time block, the first time block second energy value representing an amount of energy in a second frequency band of the first time block;
   (c) calculating a second time block first energy value and a second time block second energy value, the second time block first energy value representing an amount of energy in a first frequency band of the second time block, the second time block second energy value representing an amount of energy in a second frequency band of the second time block;
   (d) determining if an attack has occurred in the second time block based upon a comparison of the second time block first energy value and the second time block second energy value and a comparison of the first time block and the second time block.

2. The method of claim 1 wherein the step of calculating the first time block first energy value and the first time block second energy value comprises:
   (a) generating a first time block frequency representation;
   (b) partitioning the first time block frequency representation into the first frequency band of the first time block and the second frequency band of the first time block; and
   (c) generating the first time block first energy value and the first time block second energy valued based upon the first frequency band of the first time block and the second frequency band of the first time block, respectively.

3. The method of claim 2 wherein the step of calculating the second time block first energy value and the second time block second energy value comprises:
   (a) generating a second time block frequency representation;
   (b) partitioning the second time block frequency representation into the first frequency band of the second time block and the second frequency band of the second time block; and
   (c) generating the second time block first energy value and the second time block second energy valued based upon the fast frequency band of the second time block and the second frequency band of the second time block respectively.

4. The method of claim 3 wherein the comparison of the fast time block and the second time block comprises a comparison of the second time block second energy value with the first time block second energy value.

5. The method of claim 4 further comprising:
   (a) outputting a signal indicative of whether an attack has occurred;
   (b) switching from a first length window to a second length window based upon the signal; and
   (c) encoding a signal representative of the second time block with the second length window.

6. The method of claim 5 wherein the first length window is longer than the second length window, the first time block first energy value is a low component energy value, the first time block second energy value is a high component energy value, the second time block first energy value is a second low component energy value, and the second time block second energy value is a second high component energy value, the high component energy values representing a higher band of frequencies than the low component energy values.

7. The method of claim 6 wherein the low component energy values represent a band of frequencies from about 0 Hz to about 3 kHz and the high component energy values represent a band of frequencies from about 3 kHz to about 20 kHz.

8. The method of claim 1 wherein the audio signal is further partitioned into a set of additional time blocks comprising a third time block, a fourth time block, . . . , an $N-2^{\text{d}}$ time block, an $N-1^{\text{st}}$ time block, and an $N^{\text{th}}$ time block, the set of additional time blocks being grouped into a set of pairs of time blocks comprising the second time block and the third time block, the third time block and the fourth time block, . . . the $N-2^{\text{d}}$ time block and the $N-1^{\text{st}}$ time block, and the $N-1^{\text{st}}$ time block and the $N^{\text{th}}$ time block, for each of the set of pairs of time blocks, the method further comprising repeating steps (a) through (c) wherein a first listed time block in the set of pairs of time blocks and a second listed time block in the set of pairs of time blocks are treated as the first time block and the second time block, respectively.

9. The method of claim 8 wherein the audio signal comprises a plurality of additional sets of N time blocks, the method further comprising, for each further set of N time blocks in the plurality of additional sets of N time blocks, the steps of:
   (a) repeating steps (a) through (c) of claim 1 for a first time block and a second time block in the further set of N time blocks;
   (b) grouping a set of additional time blocks, comprising a third time block, a fourth time block, . . . , an $N-2^{\text{d}}$ time block, an $N-1^{\text{st}}$ time block, and an $N^{\text{th}}$ time block, from the further set of N time blocks into a set of pairs of time blocks comprising the second time block and the third time block, the third time block and the fourth time block, . . . the $N-2^{\text{d}}$ time block and the $N-1^{\text{st}}$ time block, and the $N-1^{\text{st}}$ time block and the $N^{\text{th}}$ time block; and (c) for each of the set of pairs of time blocks, repeating steps (a) through (c) of claim 1 wherein a first listed time block in the set of pairs of time blocks and a second listed time block in the set of pairs of time blocks are treated as the first time block and the second time block, respectively.

* * * * *